(No Model.)

BEST AVAILABLE COPY

J. M. GULL.
METHOD OF WELDING.

No. 508,012.                    Patented Nov. 7, 1893.

WITNESSES:
S. E. Clarkson
M. A. Bolsinger

INVENTOR
John M. Gull
BY Ward Raymond
ATTORNEY.

UNITED STATES PATENT OFFICE.

JOHN M. GULL, OF JOHNSTOWN, PENNSYLVANIA, ASSIGNOR, BY MESNE ASSIGNMENTS, TO THE JOHNSON COMPANY, OF PENNSYLVANIA.

METHOD OF WELDING.

SPECIFICATION forming part of Letters Patent No. 508,012, dated November 7, 1893.

Application filed December 14, 1892. Serial No. 455,152. (No specimens.)

*To all whom it may concern:*

Be it known that I, JOHN M. GULL, a citizen of the United States, residing at Johnstown, county of Cambria, State of Pennsylvania, have invented a new and useful Method of Welding, of which the following is a true and exact description, due reference being had to the accompanying drawings.

This invention relates to a certain improved method of welding metal pieces, one or more, of small mass to a metal piece of large mass, or metal pieces of smaller to pieces of larger mass. It has been found in practice that where metallic pieces of small mass are welded to one of large mass, in cooling, the contraction of the hot welded portion tends to bend the piece of large mass and if straightened when cold, the elongation of this portion tends to rupture the piece, sometimes fracturing and often weakening it. I have discovered, if, during the welding operation while the welded part is hot, the piece of large mass be placed under a strain causing it to bend in a direction reverse to that which the contraction resultant from the welding process would cause it to move, that after the welding is completed the tendency of the piece of large mass to bend in cooling causes it to return to an approximately straight condition so that the structure is relieved of strain when straight. During this bending the hot welded portion being the point of least resistance and practically non elastic will stretch and yield while the cooler metal surrounding it is not stretched beyond its elastic limit. As this hot portion is the only part which subsequently contracts, the stretching of it not only relieves this part of the internal strains that would exist if not so removed, but will leave the structure as a whole, upon ultimately cooling approximately straight and so reduce the amount of stress put in same in any subsequent process of straightening or curving.

I will describe how this improved method has been carried on successfully in the welding of rails and supports together and in which the heat at the welding point was caused by an electric current.

In the accompanying drawings is shown sufficient of the apparatus to illustrate the invention.

Figure 1:
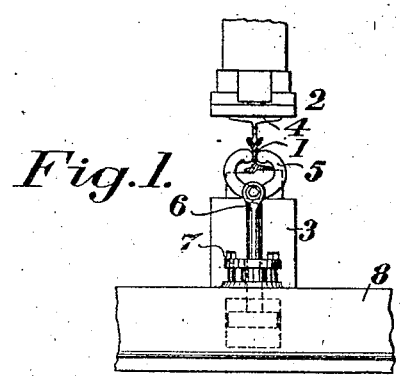
Figure 2:
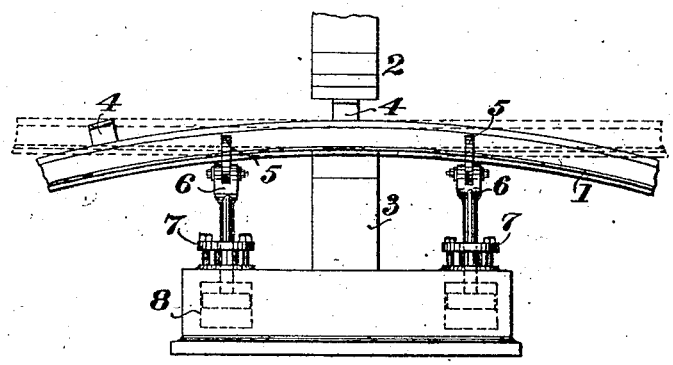

Figure 1 shows in elevation an inverted rail in cross section, resting on a support, an inverted rail base resting on the rail in position for welding, a plunger head bearing down on the rail base and an end view of a device engaging the rail for bending down or cambering the rail, while it is being welded or afterward while still hot. Fig. 2 is a side view of the parts shown in Fig. 1, showing a portion of the rail as it is bent down, while the welded portion is still hot.

As the mechanism for welding bases or supports to railroad rails is well known, it is not illustrated and the method of electric welding will only be referred to, so far as to point out the present invention.

The contact blocks for conducting the current of electricity to the two pieces to be welded are omitted from the drawings in order that the method described may be more plainly illustrated. The said contact blocks are so arranged as to cause the current to traverse the webs of rail and base in such manner as to pass from one to the other through the portions to be welded.

In welding bases or supports to railroad rails, a rail is supported beneath a plunger head 2, on a suitable support 3. A base or support 4 is placed on the rail 1, and held in place by the plunger head 2. Electrical contact is then made with the base and the rail. Heat by an electric current is developed and concentrated at the welding point and pressure applied. During the welding or immediately after while the heat of the weld is still present, the rail is bent down each side of this point. When the rail is released from this bent position, it returns therefrom as it cools to approximately a straight position. Any suitable device may be employed to bend down the rail. To illustrate one way of doing this, the apparatus shown in the accompanying drawings may be employed, consisting of a pair of clamps 5, adapted to bite the rail 1, and mounted on the upper end of movable rods or plungers 6, projecting from cylinders 7 in a suitable base 8. The rods 6 may be operated by a suitable power, to draw down the rail 1, to a bent position as shown in Fig. 2. Although in the drawings this is indicated as occurring under the machine, the weld which has been operated upon may be removed when hot, in which case the weld will be cooling and straightening while the next weld is being made and bent. After a base 4 has been welded to a rail 1, and the rail bent, as aforesaid, the bent rail 1 is released from the clamps 5, and returns to an approximately horizontal position when cold, as shown in dotted lines in Fig. 2. But one clamp may be employed, if desired, though two are preferable. The device for bending the rail may be located at a short distance from said welding point, such as to give sufficient power for bending the rail.

I do not intend to limit myself to the apparatus shown and described, as other means for bending the rail or other piece of large mass during the welding, and other means to weld the parts together may be used without departing from my invention, and moreover the rail after being welded can be allowed to cool and subsequently heated at the welded part and bent, this said process of relieving strain being made a separate and distinct process.

Having now fully described my invention, what I claim, and desire to protect by Letters Patent, is—

1. The hereinbefore described improvement in the method of welding a metallic piece of smaller mass to a piece of larger mass, which consists in welding the pieces together and bending the piece of larger mass while the mass is hot at the welded portion.

2. The hereinbefore described improvement in the method of welding a rail and support together, which consists in welding the support to the rail, and bending the rail while the welded portion is hot.

3. The hereinbefore described improvement in the method of welding two pieces of metal together, which consists in welding the two pieces together, and bending one of said pieces while the mass is hot at the welded portion.

4. In the hereinbefore described improvement in the method of welding supports to a rail, administering a series of bends to the rail only in the portions containing the welds while hot at the welded portions, for the purpose set forth.

5. The hereinbefore described improvement in the method of welding supports to a rail, which consists in successively welding the supports to the rail and bending the rail while hot at each welded portion.

6. The hereinbefore described improvement in the method of welding supports to a rail, which consists in successively welding the supports to the rail and stretching the welded portions while hot.

In testimony whereof I have affixed my signature in presence of two witnesses.

JOHN M. GULL.

Witnesses:
WM. D. McELHINNY,
WM. A. DONALDSON.